Figures 1, 1A:
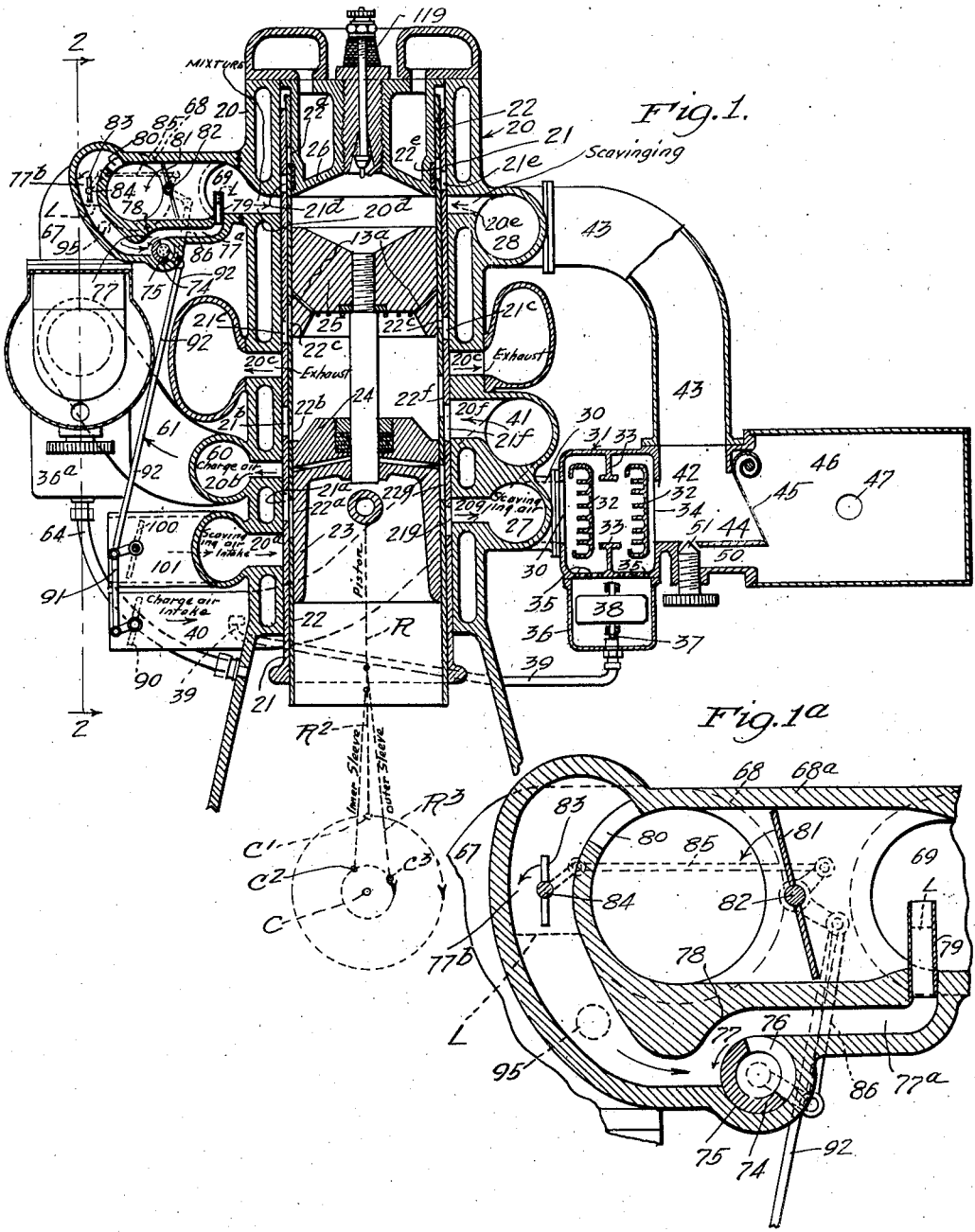

March 1, 1927. 1,619,460
J. M. CAGE
INTERNAL COMBUSTION ENGINE AND MEANS FOR SUPPLYING CHARGE THERETO
Filed July 23, 1920   8 Sheets-Sheet 1

Inventor:
John M. Cage
By [signature]
his Attorneys

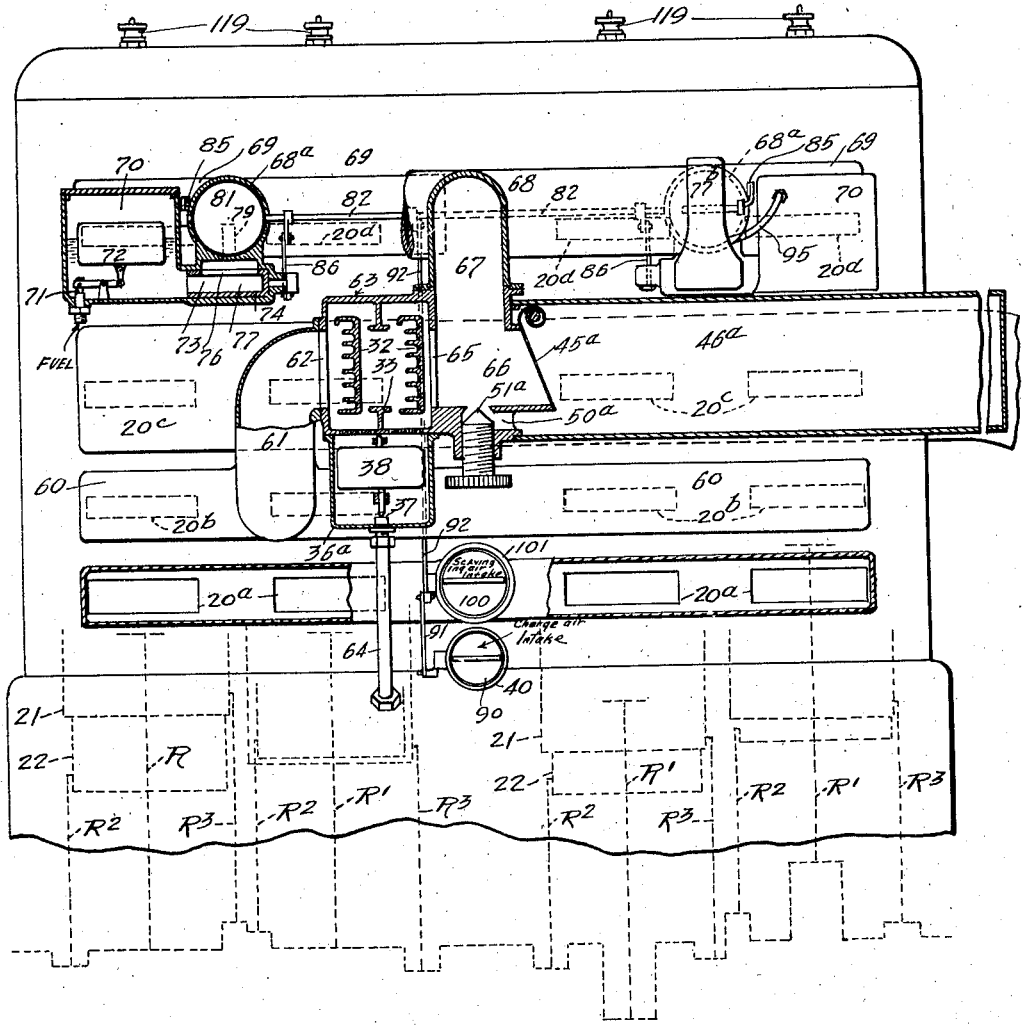

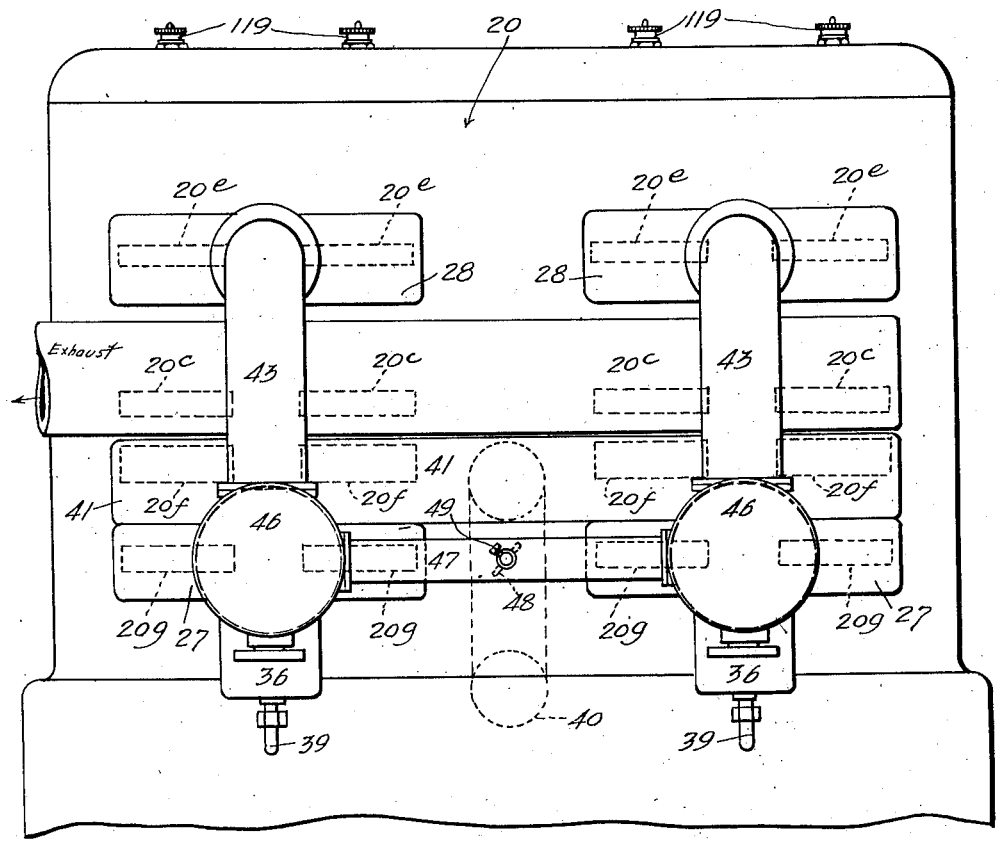

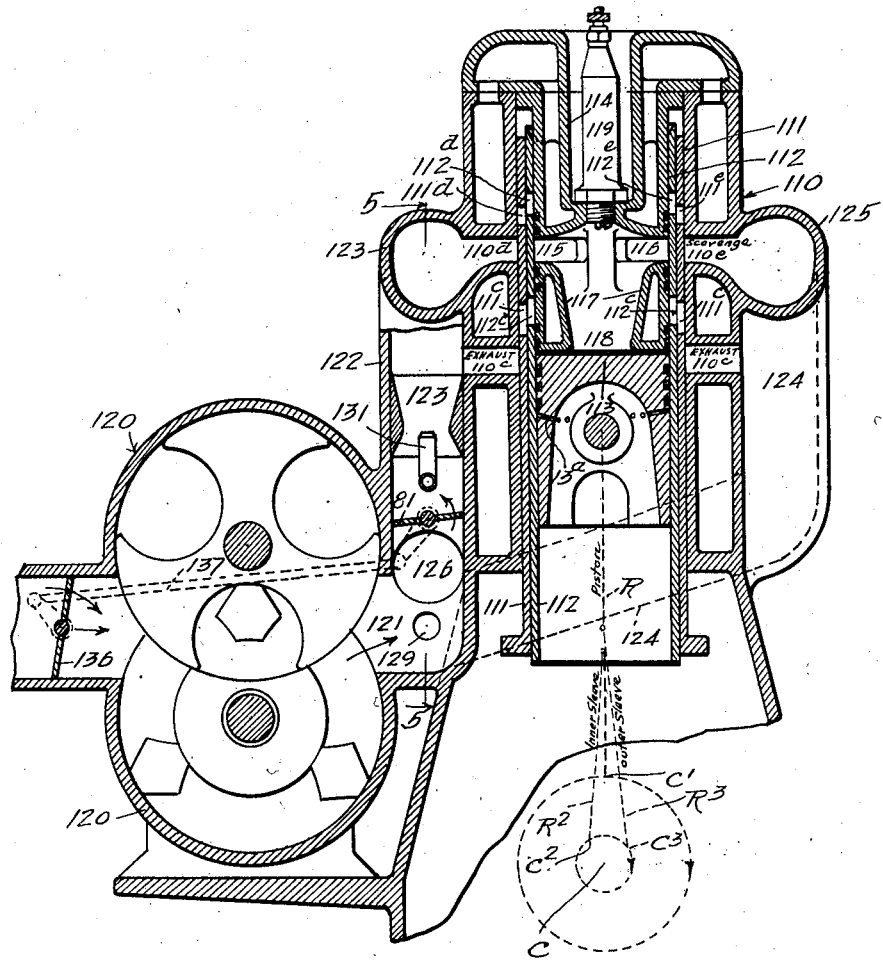

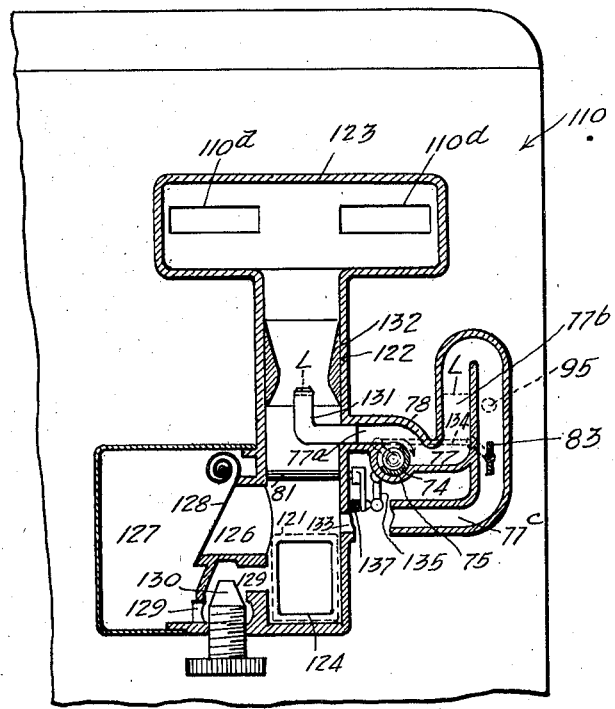
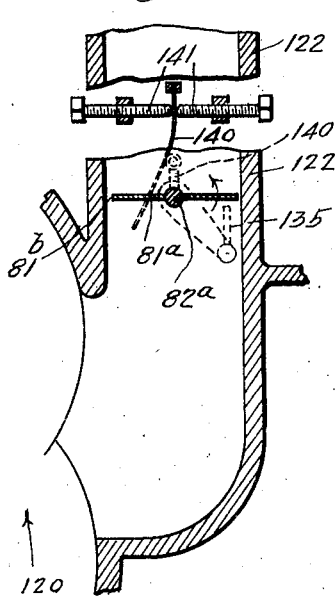
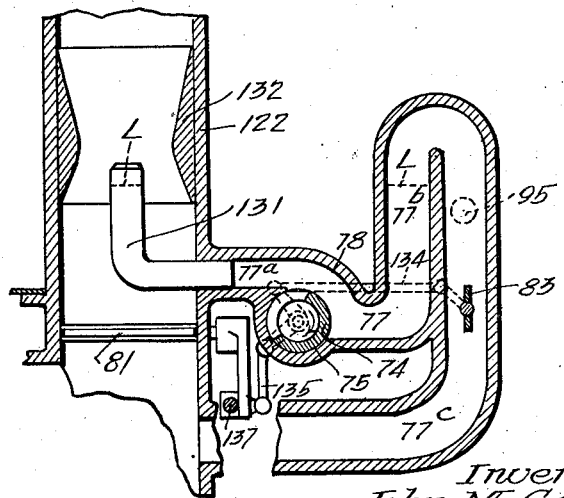

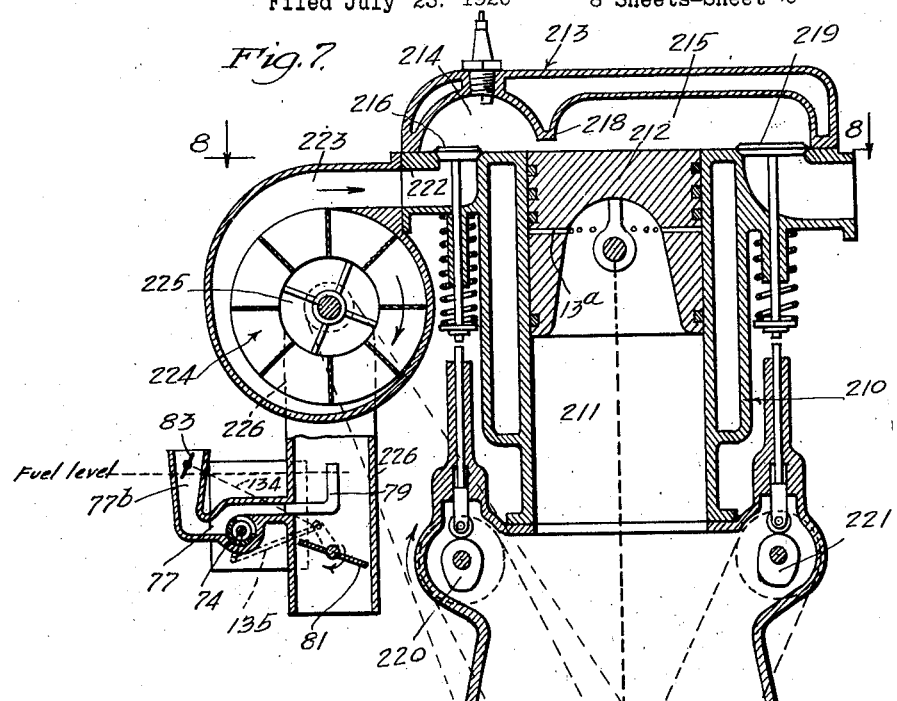
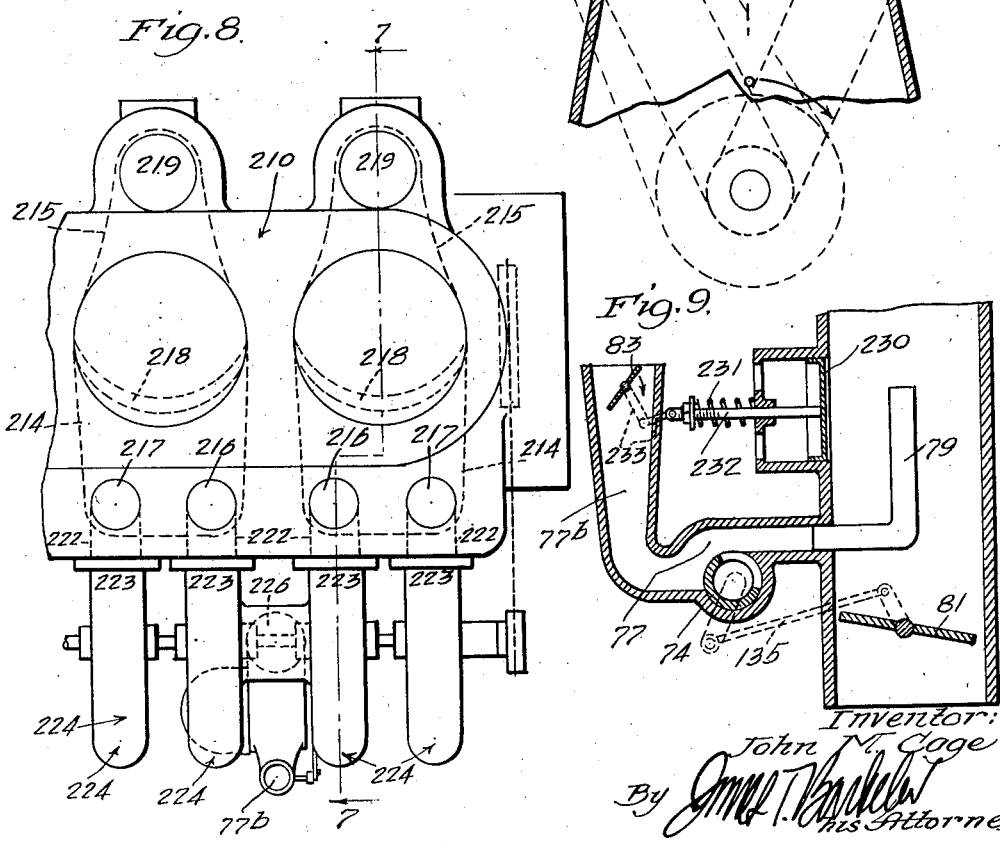

March 1, 1927. 1,619,460
J. M. CAGE
INTERNAL COMBUSTION ENGINE AND MEANS FOR SUPPLYING CHARGE THERETO
Filed July 23, 1920  8 Sheets-Sheet 7
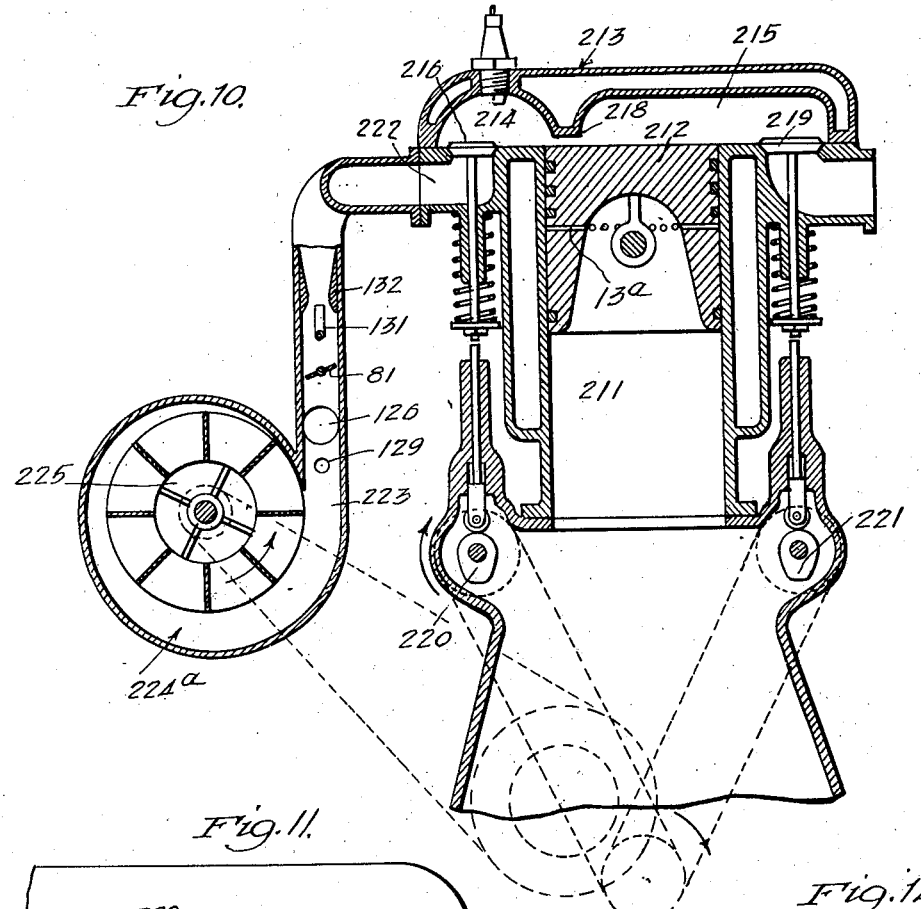
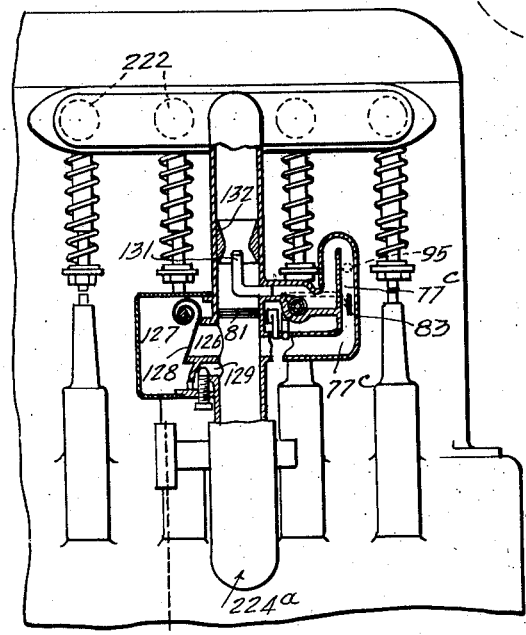
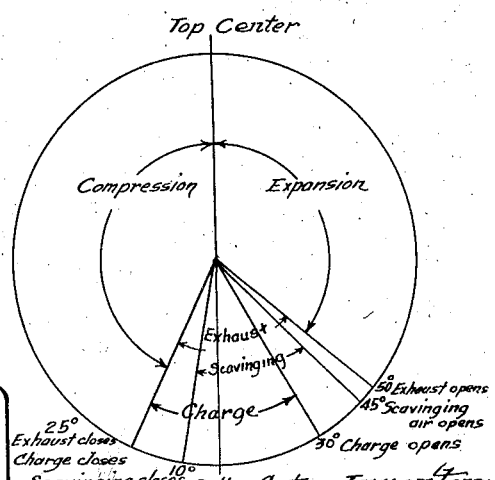
Inventor:
John M. Cage
By his Attorney Patented Mar. 1, 1927.

1,619,460

UNITED STATES PATENT OFFICE.

JOHN M. CAGE, OF FORD CITY, ONTARIO, CANADA, ASSIGNOR TO CAGE ENGINE SYNDICATE, INC., OF NEW YORK, N. Y., A CORPORATION OF DELAWARE.

INTERNAL-COMBUSTION ENGINE AND MEANS FOR SUPPLYING CHARGE THERETO.

Application filed July 23, 1920. Serial No. 398,329.

This invention relates generally to internal combustion engines, not being limited to engines of any particular cycle of operations, although, as hereinafter described, and for the purpose of setting forth a specific embodiment of my invention, I describe more particularly the invention as applied to a two-cycle engine.

The more general and broader objects of the invention will be best understood from a short consideration of the inherent difficulties found in internal combustion engines; while the more detailed objects of the invention, and the corresponding detailed accomplishments, as well as the general accomplishments of my invention, will be best understood from a consideration of specific forms of the invention applied to a two-cycle engine. Accordingly, I shall not attempt, in the following broad preliminary statement of my invention, to more than give a general idea of what the invention is intended to accomplish, and, of the means by which those accomplishments are obtained; leaving a full comprehension of the invention, both in its broad aspects and in its particular details of application, to be understood from the succeeding specific descriptions of typical forms of mechanism embodying the invention.

In the course of prolonged experimentation, development work, and tests of internal combustion engines, I have found that there is an inherent difficulty in such engines which materially cuts down the volumetric efficiency of the engine at varying speeds. All internal combustion engines are, to a certain extent, "one speed engines"—that is, they obtain their highest efficiency at the certain speed for which they have been particularly designed. This deficiency in internal combustion engines is most marked in two-cycle engines, although it is also true of four-cycle engines. Either type of engine must necessarily be designed to operate efficiently at some predetermined speed. If that speed is exceeded it is of course readily apparent that the engine, upon each cycular operation, cannot take in a full charge in the shortened time period; and accordingly its efficiency drops. In a four-cycle engine, it is of course possible to overcome these defects to a large extent by increasing the port area; but there are practical mechanical limitations upon the increase of port area (such as excessive heating present in large valves which are difficult to cool); with the result that, in practice, all four-cycle engines, as well as two-cycle engines, have a practical limiting speed above which they become inefficient, due to the fact that they do not receive a full charge. In addition to the foregoing described "high speed inefficiency", the two-cycle engine also has a low speed inefficiency. Two cycle engines take their succeeding charge while exhausting the burnt gases of the preceding charge, the exhaust and intake ports being open simultaneously. A two-cycle engine must necessarily be designed in its port areas, charge compression mechanism, and speed of movement of the charge and of the exhaust, for a particular speed of operation. If the engine falls below that speed of operation, then the speed of travel of the exhaust and of the incoming charge is too fast for the operation; with the result that the charge blows through the exhaust ports to a greater or lesser extent, and is also blown back through the intake port as the piston starts on its return stroke, because the pressure in the intake manifold has been reduced excessively; with the result that the "volumetric" efficiency is greatly lowered. And the "volumetric" efficiency is also lowered in such circumstances, due to the fact that the incoming charge enters at so high a relative velocity that it to a certain extent churns up the burnt gases in the cylinder; and the total result under such circumstances usually is that a part of the fresh charge goes out with the exhaust gases and part of the exhaust gases remain in the cylinder to decrease the efficiency of the fresh charge. For these foregoing stated reasons my invention has peculiar efficacy in a two-cycle engine, where the exhaust is scavenged by an incoming charge and where it is necessary, in order to keep up efficiency, to keep a balance, so to speak, between the speed of travel of the gases and the speed of engine operation. Thus it will be seen that, although in its broadest aspect, the invention is applicable to all internal combustion engines, it is applied in a distinctive way, to obtain distinctive results, on two-cycle engines.

The result of the foregoing described inefficiencies is that internal combustion engines as a class, and more particularly two-cycle internal combustion engines, are "one speed" engines. While it is true that the four-cycle engine has been developed to the point where it is flexible in operation and may be operated throughout a large variation of speed, it is nevertheless also true that it is not at all efficient in its operation except at the predetermined speed for which it has been designed. And in two-cycle engines the flexibility of operation is not nearly so good as in four-cycle engines; it is not possible to operate a two-cycle engine over the range of speed possible to a four-cycle engine; and the variation in efficiency in a two-cycle engine is so great as to have made it hitherto practically impossible to use in automobiles, airplanes, etc.

I have discovered that this inefficiency in such engines may be overcome by varying the pressure under which the charge is fed to the cylinder in accordance with the resistance to the flow of the charge into the work cylinder. Generally speaking, this resistance to the flow varies as the square of the speed of operation of the engine. In most or all engines heretofore constructed, the pressure behind the charge tending to flow the charge into the work cylinder, has either been practically stationary or has had a variation that has had no connection whatever with the speed of operation of the engine. (When I herein refer to the pressure tending to flow the charge into the work cylinder it will be understood that I refer generally to the effective pressure, whether that is caused entirely by the suction of the engine acting at a pressure below atmosphere, or by applied pressure above atmosphere behind the charge, or by both.) For instance, in the ordinary two-cycle engine having crank case compression or compression by a separate pump of some character or other, the pressure on the charge will either remain substantially stationary at all practical speeds of operation, or it will increase to a slight extent as the engine increases its speed, and then, having reached a maximum, will, as the speed further increases put less and less charge into the work cylinder. On the other hand, with lower speeds, the charge pressure remaining stationary, or substantially so, the charge is blown into and through the cylinder at such high speed relative to the speed of operation, that the gases are largely churned up in the work cylinder, with the results of loss of charge and retention of burnt gases, as hereinbefore stated.

It is one of the general objects of this invention, to provide a means for uniformly charging the work cylinder regardless of speed of operation, to put into the cylinder a charge that is not varied by variations in operation speed. Broadly speaking, I accomplish my desired results by providing in connection with the engine, a means for causing the charge to be fed under a pressure which varies in accordance with the variation in the resistance to flow of the charge. With a properly constructed engine, this resistance to flow varies generally as the square of the speed of operation. I provide means which causes the pressure on the charge to vary generally as the square of the speed of operation; with the result that when the engine is operating at high speed, the charge is under an approximately high pressure; while when the engine is operating at low speed, the charge is under an approximately low pressure. The engine having then been once designed for proper operation at some given speed, it will properly and efficiently operate at a wide range of speed.

Or I may describe my invention broadly as involving means or arrangements that will efficiently put the full charge into the cylinder at the highest speed; and involving also means or arrangements that will retard the flow of the charge at lower speeds.

In supplying such an automatically varying pressure to the intake of an internal combustion engine, the pressure producing means may be located either between the carbureter and the engine intake, or may be located outside the carbureter. In the first instance the carbureter operates as carbureters normally do, that is, it operates at atmospheric pressure with suction on the outgoing side. In the second instance, the carbureter operates under pressure.

Although either system will accomplish the desired results, I have found that it is desirable to carburet under pressure because there is then a minimum tendency for the carbureted charge to drop its liquid fuel. In such a system the carbureter can be very close to the actual cylinder intake.

It is also one of the general objects of this invention to provide a system of carburetting that will operate efficiently under pressure and that will operate efficiently under varying pressure (meaning the effective difference in pressure under which the carbureter is operating whether it is operating under suction, or under pressure, or both). And my system of carburetion, as will be hereinafter explained, is, by its inherent characteristics, suitable for application to an ordinary engine, operating under suction, without my special pressure producing means.

I have also found it desirable to keep the pressure of the charge (both of the scavenging air and of the charging air), as low as possible, so as to avoid as much as possible the "jetting" of air or charge into the work cylinder. Where the pressures are high and the linear velocity is correspondingly high, there is a greater relative lag of the outer parts of the moving column of air due to friction with the passage walls; with the result that the moving column does not move uniformly over its whole cross section, and the charge has more or less tendency to penetrate the exhaust in the cylinder rather than displace it from the cylinder. This is avoided by keeping the pressure and velocity as low as possible. Accordingly, in my engines I preferably design the passage areas and the port areas and the time periods during which the ports are open, to accomplish the efficient introduction of charge to the cylinder under the lowest practicable pressure at the highest operating speed. This pressure may be in some instances not to exceed a half pound per square inch above atmosphere. Then, the engine having been designed for operation at its highest speed with a comparatively low pressure on the charge, the pressure producing apparatus or controlling apparatus for the charge is so operated as to vary the pressure in accordance with any proportionately lower speed of operation. The particular pressure at any particular speed will of course depend upon the design of the engine and will depend upon the pressure utilized at the highest speed of the engine. And although I state that, with a properly designed engine, it may not be necessary to have the pressure, for average speed of operation, above a half pound or so square inch above atmosphere, it will of course be readily recognized that the pressure on the charge may be made higher without departing from my invention.

It is also an object to keep the charge pressure at the intake port or ports uniform throughout the stroke—to keep the charge flowing at a uniform pressure instead of the pressure being allowed to fall as the charge flows into the cylinder.

In an engine where a pump of the piston type, or similar type, is utilized for raising the pressure of the charge, it is also an object to provide an oil separator which will effectively remove the lubricating oil from the charge so as to prevent that lubricating oil from entering the work cylinder.

In the application of my invention to a two-cycle engine, I illustrate and describe, in some instances, separate pressure raising means for separate scavenging air and charging air. The scavenging air that remains in the work cylinder becomes a part of the actual work charge; but, whether this is true to a greater or lesser extent or not, it will be understood that wherever I use the word "charge" generally, I mean to include the air or charge which performs the service of scavenging, as well as the actual charge which forms the final work charge for the work cylinder; while I refer to the working charge as charge proper or working charge, or refer to the air for that charge as air for the cylinder or work charge. It will be readily understood from the context just what is being referred to; but I deem it desirable to make this preliminary explanation for the reason that, although in ordinary two-cycle engines it is common to make one and the same charge do the work both of scavenging and of charging the cylinder with its work charge, yet I prefer to use separate charges for those two operations. But at the same time I do not limit my invention necessarily specifically to the use of two separate and distinct charges, for scavenging and for giving the cylinder its work charge. These two separate charges may be compressed by separate or common means.

There are many other objects of the invention, and corresponding accomplishments of the mechanisms hereinafter described; but these various objects and corresponding accomplishments, as well as the broad objects of the invention, and the invention itself as well as the specific applications of it, will be best understood from the following description of typical and now preferred forms of the invention as applied to two-cycle engines. The following description is given in specific detail; but it will be understood that this specific detail is gone into not for the purpose of limiting the invention to the details set out, but for the purpose of rendering my invention most clearly intelligible as well in its specific application as in its broader aspects. And for the purpose of these specific descriptions, I now refer to the accompanying drawings—

Figure 13:
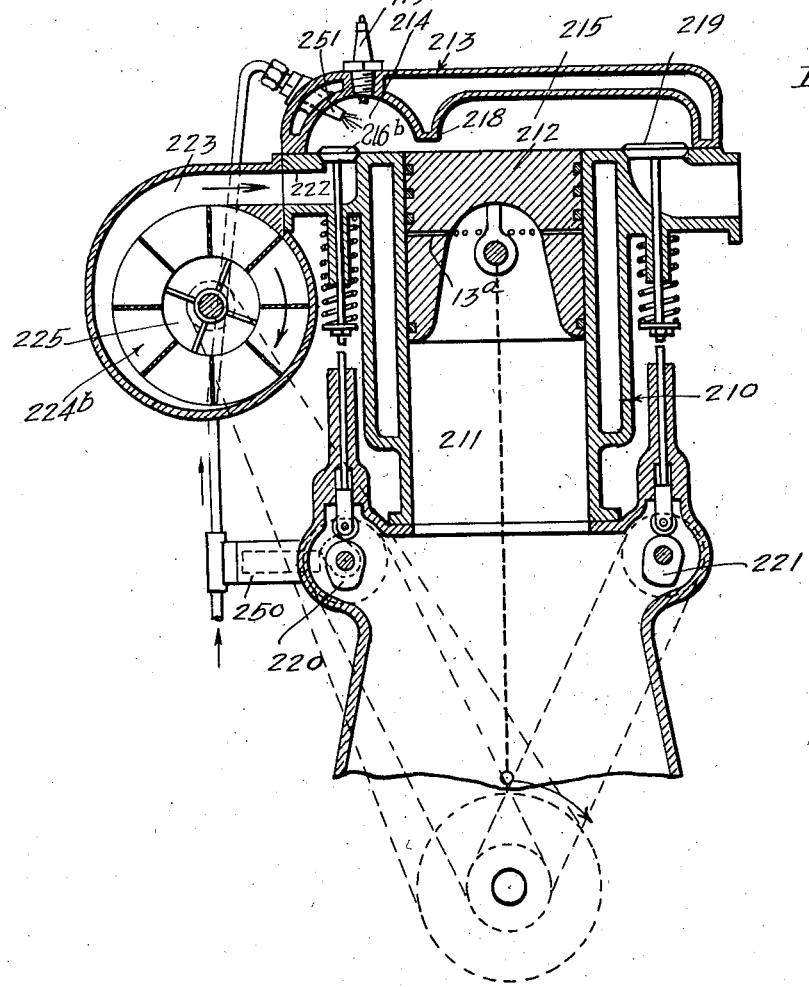

Fig. 1 is a vertical section through one form of two-cycle engine equipped with my invention; Fig. 1ª is an enlarged section of the carbureter shown in Fig. 1; Fig. 2 is a side elevation and vertical section of the same, the section being taken as indicated by line 2—2 on Fig. 1; Fig. 3 is an opposite side elevation of the engine; Fig. 4 is a vertical cross section of a somewhat different form of engine equipped with a different form of pressure raising device; Fig. 5 is an elevation and section of the same, the section being taken as indicated by line 5—5 on Fig. 4; Fig. 5ª is an enlarged section of the carbureter shown in Fig. 5; Fig. 6 is a partial view similar to Fig. 4 showing a different form of mechanism for controlling operation of the throttle valve of the carbureter; Fig. 7 is a vertical cross-section of another form of engine equipped with another form of pressure raising device; Fig. 8 is a plan of the same with the head block removed, said view being taken as indicated by line 8—8 on Fig. 7; Fig. 9 is an enlarged detail section showing a variation in the method of controlling one of the carbureter valves; Fig. 10 is a view similar to Fig. 7 showing a modification of the mechanism shown in Fig. 7; Fig. 11 is a side elevation, with parts in section of the form of mechanism shown in Fig. 10; Fig. 12 is a diagram illustrating the typical sequence of events in a two-cycle engine of the character herein described; and Fig. 13 is a sectional view showing a mechanism similar to that of Fig. 7 but showing the application of my invention to an engine of the fuel injection type.

Referring now first to Figs. 1, 1ª, 2 and 3, I show therein a form of two-cycle engine which operates on a sequence illustrated in Fig. 12. This two-cycle engine is of the general type and construction illustrated, described and claimed in my prior applications on internal combustion engines, Serial Number 283,897, filed June 16, 1914; Serial Number 173,409, filed June 7, 1917; and Serial Number 252,356, filed September 3, 1918.

It is not necessary here to go into a detailed description of construction and operation of this engine except in so far as is necessary to a complete understanding of the application of my present invention to it. In this form of engine there is a cylinder block 20 having cylindrical bores in each of which two concentric sleeves 21 and 22 are adapted to reciprocate. I find it best to make the inner sleeve of steel and the outer of bronze (preferably die casting bronze), the outer sleeve running in the cast iron cylinder block. These metals make the best combination and are free from seizure. These sleeves are provided with suitable ports adapted to register with ports in the wall of the cylinder block as follows: Ports 21ª and 22ª are adapted to register with ports 20ª through which the scavenging air is taken into the air compressing space above piston 23 and below head 24 which is mounted in and travels with the inner sleeve 22; ports 21ᵇ and 22ᵇ are adapted to register with port 20ᵇ through which the compressed air for the working charge passes from the compression space below this piston 25 and above head 24; ports 21ᶜ and 22ᶜ are adapted to register with the final exhaust ports 20ᶜ; ports 21ᵈ and 22ᵈ are adapted to register with ports 20ᵈ through which the mixture under pressure is taken into the work chamber above work piston 25 and below the cylinder head 26; ports 21ᵉ and 22ᵉ are adapted to register with ports 20ᵉ through which the scavenging air under pressure is admitted to the work chamber above piston 25; ports 21ᶠ and 22ᶠ are adapted to register with ports 20ᶠ through which air for the working charge is first admitted to the compression space below work piston 25; and ports 21ᵍ and 22ᵍ are adapted to register with ports 20ᵍ through which scavenging air is expelled under pressure from the compression space above the compression piston 23. In the previous construction of such an engine as herein described, the scavenging air from port 20ᵍ, or from the several ports 20ᵍ of a multiple cylinder engine, has passed into a manifold 27 and from that manifold has passed directly, or through a passage of some capacity to act as a reservoir, to the manifold 28 which feeds the port 20ᵉ, or feeds the several ports 20ᵉ of a multiple cylinder engine. In my present invention I interpose between manifold 27 and manifold 28 a pressure controlling device which effects the mode of operation hereinbefore outlined. This operation may be referred to and described generally as a special controlling operation which keeps the effective pressure at the desired point, automatically varying with variations in speed of operation of the engine. Or it may be considered as a means to allow quick passage of the air when the engine is operating at high speed and to retard the passage of the air when the engine is operating at low speed. The form of my invention here illustrated, and the form of engine mechanism here illustrated, are typical of engines having a charge compressing mechanism which compresses, with any given throttle opening, a certain constant amount of air or charge upon each operation of the engine, and which consequently, if the same amount of that charge enters the engine work cylinder each time, would maintain a constant pressure in the transfer manifold. But at higher speeds the charge has less and less opportunity to enter the work cylinder, with the result that a pressure is built up in the transfer manifold. I utilize the fact of lessened time opportunity for entry of charge into the work cylinder, for the purpose of causing actuation in this form of my controlling devices to gradually throw the retarding means out of operation in proportion as the speed is increased. This engine being, as hereinbefore indicated, one of the type in which separate scavenging air and work charge air are used. I provide separate pressure controlling mechanisms for them. In the present illustration of the invention these two controlling mechanisms are in their broad essentials the same; although there are some differences in detail. For instance, in a four-cylinder engine such as illustrated, there may be a single control mechanism for all four cylinders or there may be more than one such control mechanism. I illustrate here a single control mechanism on the carbureter side of the engine and two control mechanisms on the scavenging side of the engine.

On the scavenging side of the engine the manifolds 27 each serve two cylinders, and from each of these manifolds 27 there is an outlet 30 leading into an oil separator 31. This oil separator may be of any suitable kind; but typically it may embody a chamber of sufficient size to cause a temporary substantial drop in velocity of the air Within the chamber there are suitable baffles 32 and 33 causing the air to take a circuitous route to the outlet 34 from the oil separator. It will be understood that the sleeves and pistons are lubricated in any suitable manner, and that the air charges compressed by the pistons pick up a certain amount of this oil. It is undesirable to have this oil carried by the charges into the work chamber. The lubricating oil picked up in the scavenging air compression cylinder and carried out by the air drops out and passes through the perforated bottom at 35 into an oil chamber 36 whose outlet valve at 37 is controlled by a float 38. The oil which escapes from this float controlled outlet passes through a pipe 39 into the work charge air intake 40, where the oil is carried by the flow of air into the manifold 41 which feeds the port 20'. The lubricating oil is thus carried into the space below work piston 25 and assists in lubricating that piston.

Outlet 34 from oil separator 35 is in direct communication through the passage 42 with pipe 43 that leads directly to manifold 28 which feeds the ports 20ᵉ. Passage 42 also has an outlet at 44 controlled by a very light and delicate valve 45 and forming the opening to a reservoir 46 of considerable capacity. In an engine of the size illustrated, with a work cylinder diameter of about three and one-half inches and a stroke of say three and three-quarter inches, the capacity of the reservoir 46, (of which there are two) may be as much as fifty cubic inches or more. These two reservoirs 46 are connected by a cross-pipe 47 so that, in effect, they may form a single reservoir of comparatively large capacity. In the pipe 47 between the two reservoirs, I may place a valve 48 which may be set and held in any suitable position by any suitable means, as by a set screw 49. Adjustment of this valve may effect the amount of communication between the two reservoirs, and therefore, as to each reservoir and as to its effect upon the operation of two cylinders of the engine, vary the effective reservoir capacity in each control system.

The outlet from each reservoir is at 50, leading back into the passage 42; and this outlet may be controlled by a suitable valvular means, as illustrated at 51, for the purpose of controlling the speed of escape of air or gases from the reservoir. The valve at 45 is preferably a light and sensitive valve, being illustrated as of that type of valve known commercially as the "Gutermuth" valve. This valve may be adjusted to operate under very small differences of pressure, and to seat tightly and quickly.

With the foregoing described features of construction in mind, the general features of operation of the pressure controlling mechanism may now be understood. In the operation of an ordinary engine, with ports and passages designed to admit the charge into the cylinder at any given predetermined speed, it is readily understood that ordinarily the tendency is for the pressure in the transfer manifold (the manifold or transfer pipe corresponding to the pipe 43 here) to tend to rise as the engine increases in speed of operation and tend to fall as the engine decreases in speed of operation. This increase and decrease in speed of operation, however, is small as compared with the variation in pressure requisite for overcoming the much higher resistance at the high speeds and for putting the charge through slowly enough under the much lowered resistance at low speed. In other words, as has been hereinbefore explained, the too high pressure at low speed simply causes a blowing through of the charge along with the exhaust, and a mixing up of remnant exhaust gases with the incoming charge, and at high speed causes an insufficient charge. Now in such an operation of the engine, my mechanism acts as an equalizer. At low speed, a part of every compressed charge will enter reservoir 46 through valve 45, and there stand at pressure which depends, among other things, upon the relation of capacity of the whole transfer system between ports 20ᵍ and 20ᵉ to the capacity of the pumping cylinder. The increased capacity of this transfer system, due to the interposition of reservoir 46 in the system, causes that pressure, at low speed, to be considerably lower than it would ordinarily be; and the amount by which it is lower than it would ordinarily be is controlled, as stated, by the total capacity of the system as compared with that of the direct transfer manifold (the transfer manifold proper), which capacity of the whole system may be varied by varying the capacity of reservoir 46. Consequently, as port 20ᵉ is opened, the charge begins to flow in under a comparatively much lowered pressure; and as the charge flows in, lowering the pressure in manifold 28 and transfer pipe 43, the air which has passed into the reservoir 46 passes out of that reservoir through the valve controlled passage 50 and thus finds its way to the port 20ᵉ and passes through that port. The effect of this reservoir 46 at low speed is not only that of an enlargement of capacity of the transfer system, but it also effects a retarded action due to the retardation of the flow of air from the reservoir 46 through the restricted outlet at 50. Thus the flow through port 20ᵉ is not only made comparatively slow but it is also made uniform throughout each charging operation; because the action of the reservoir in restrictedly feeding the transfer manifold keeps the pressure more nearly up to the initial manifold pressure than it would otherwise be. At increasingly higher speeds the reservoir, with its excess capacity, is cut more and more out of operation. At high speeds, as the pressure in the transfer system increases, the pressure in reservoir 46 is gradually built up, due to the restricted outlet at 50; until, at very high speeds, when the air in the reservoir has very small opportunity to escape through port 50 during the small time period in which port 20ᵉ is open, the reservoir 46 practically is put out of commission, and the compressed air goes right through the transfer pipes and passages, practically just as if the reservoir was not in connection with them. The reservoir then acts, not to take and exhaust its full capacity on each operation, but merely to keep the transfer manifold pressure up to its original pressure through each operation, by reason of the restricted escape of air through port 50. Under these circumstances, it will readily be seen that, by properly designing and proportioning the cross-sectional areas and the capacity of the transfer passages in such a manner that the pressure raised therein by the operation of the pump system is sufficient to force the charge through the transfer passages and into the cylinder at a high speed of operation; and by proportioning and designing the capacity of reservoir 46 so that, at low speed of operation where there is time for the reservoir capacity of air to effectually act, the combined capacity of the transfer system proper and the reservoir is sufficient to lower the effective pressure of the charge to that pressure which will just carry the charge into the cylinder during the longer period of time that port 20ᵉ is open; the volume of charge taken by the work cylinder on each stroke is made to be unaffected by variations in speed of operation and consequently the compression pressure is unaffected by variations in speed. As I have before said, I have found it desirable to keep the charge pressure as low as is possible consistent with reasonable sizes and time periods of opening of the ports. Of course the time of opening of the intake port is controlled very largely by considerations of efficiency of operation of the engine; and the size of the port is controlled very largely by mechanical considerations; but within these limitations it is desirable to keep the pressure as low as possible in order to make the flow of charge as uniform as possible and to avoid churning up of the cylinder contents. Churning up the hot exhaust gases always leaves a certain amount in the cylinder to cause pre-ignition on the next compression. With the actual capacities determined by the pressures to be used, the transfer pipes and passages are made of as large cross-section as possible to reduce friction. Whatever may be the absolute capacities of the transfer passages and reservoirs, the relations between them, and the regulations of the various ports, they are so made that the effective pressure upon the charge, being that pressure which tends to force it through the transfer system against the flow of resistance, varies substantially as the resistance itself varies.

After an engine is once properly designed, it may not be necessary to provide valve control at 51 or to provide valve control at 48; but for the purpose of illustrating my invention I show them as controlling means. One of them controls the speed at which the air escapes from the shunt reservoir back into the transfer system proper, and the other one controls the effective total capacity of the reservoir to a certain extent (it being remembered that the pressure in the transfer system and in the reservoir rises and falls with the pulsating action of the engine and that in a four cylinder engine no two sets of pistons are made to operate together).

On the carbureter side of the engine the air for the work charge passes out of all the ports 20ᵇ into a common manifold 60 and thence through transfer pipe 61 to the inlet 62 of oil separator 63. This oil separator 63 has the same construction as hereinbefore explained and from its oil chamber 36ᵃ a pipe 64 leads into the crank case of the engine. Thus the lubricating oil which first came out of the air compression space above piston 23 with the scavenging air and which was separated out of the scavenging air in separator 31, has passed into the charge compression space below piston 25 to assist in lubricating that piston, and the part of the oil which has then come out of that space with the compressed charging air is now separated out in the separator 63 and passes back to the crank case. This separation of the oil from the charges eliminates undue smoking in the exhaust.

The compressed charge air passes through the separator outlet 65 into the passage 66 which is in direct communication with transfer pipe 67 which feeds manifold pipe 68. From this manifold pipe 68 there are two short branches 68ᵃ that communicate with the two manifolds 69, each of which serves the intake ports 20ᵈ of two cylinders. Although, as hereinafter set forth in other forms of mechanisms, I may use a single carbureter for a whole engine, in this case I show two carbureters each serving two cylinders. Each carbureter is close to the intake ports.

The shunt reservoir 46ᵃ is arranged with its inlet valve 45ᵃ and its outlet passage 50ᵃ, controlled by valve 51ᵃ; all the same as hereinbefore described; except that the shunt reservoir 46ᵃ may be considerably larger than the reservoir 46. In fact, the single reservoir 46ᵃ may be substantially equal to the capacity of both reservoirs 46, being, in an engine of the size described, say of one hundred cubic inches capacity or more.

The structure of the carbureter in the form I prefer for use in my system is shown in detail in Figs. 1, 1ª and 2. I employ an ordinary fuel chamber 70 in which the height of the liquid is controlled by valve 71 operated by float 72. From the fuel chamber the fuel passes through the hollow interior 73 of a rotary valve 74. This rotary valve 74 is set in a bore 75 which partially encloses the rotary valve. The rotary valve has one side cut away to form a valve port at 76, and this valve port may be more or less wholly registered with the open side of the bore by rotating the hollow valve. Adjacent the valve, and communicating with the open side of the valve bore, there is a passage 77 whose wall 78 is arranged more or less concentrically with the bore so that air passing through the passage 77 in the direction indicated by the arrow in Fig. 1 will sweep around and close to the port opening 76 in the valve and come into close and intimate contact with the liquid fuel which flows through the valve. The passage 77 is extended on, as indicated at 77ª, and communicates with a tube or nozzle 79 which extends into the manifold 69. At its other end the passage 77 extends up around the manifold 68, as indicated at 77ᵇ, and has communication at 80 with the manifold 68. In the manifold extension 68ª, between the point of communication at 80, and the nozzle or tube at 79 there is a throttle valve 81 mounted on shaft 82. In the passage 77ᵇ there is another valve 83 mounted on shaft 84; and these two valves are connected together by a connecting mechanism indicated at 85 in such a manner that when throttle valve 81 turns in the direction indicated by the arrow to open, valve 83 turns in the direction indicated to close. The throttle valve shaft 82 is also connected by the connecting rod indicated at 86 to the rotary valve 74, in such a manner that when the valve 81 rotates in the direction indicated to open, the rotary valve 74 rotates in the same direction to open its port 76.

In the operation of this carbureter, when the engine is being started, liquid fuel stands in the passage 77 up to the level indicated by the letter L; valve 81 is closed and valve 83 open. The air which passes through the carbureter will therefore pass through passage 77 and will first force the liquid through into the manifolds to thence enter the cylinders. The capacity of passage 77, and the depth to which the liquid is allowed to normally stand in it, are determined in accordance with the amount of priming fluid desired to be put into the cylinders.

As soon as the engine has started its operation, air flows more or less continuously through the passage 77, picking up the liquid fuel as fast as it flows through the valve 74 and carries the liquid fuel through the nozzle 79 into the manifold 69. As the engine increases in speed, or as more and more charge air is compressed up to the carbureter, the valve 81 is opened. Many suitable means may be used for opening the valve 81, and of course at the same time closing valve 83; but, generally speaking, means are used for opening the valve 81 in accordance with the amount of air for charge being fed to the carburetor. In this particular case, the amount of air being fed to the charge, is of course the amount which is being compressed below the piston 25; and this is controlled by any suitable means, as by a throttle valve 90 on the charge air intake 40. As valve 90 is opened and more and more air is compressed to put a larger charge into the work cylinder, valve 81 is opened, valve 83 is closed, and fuel valve 74 is opened. Although I explain hereinafter other means for causing the opening of valve 81 in accordance with the amount of charge air pumped to the carbureter and to the work cylinder, I show here a mechanical connection between throttle 90, this mechanical connection being illustrated at 91 and 92. The two throttles 81 of the two carbureters in this mechanism may be mounted on the same shaft 82, so as to operate together. As a result of this interconnection, it will be seen that valve 81 opens just in proportion as valve 90 opens; so that as the valve 90 is opened to give the engine a larger charge, valve 81 is opened to pass a larger charge, and valve 83 is closed down so as to decrease relatively the amount of air which passes through passage 77. The flow of air through the manifold extension 68ª and through the manifold 69 of course has a tendency to draw the fuel out through the nozzle 79, and this tendency increases as the speed of the air increases. For this reason it is desirable to cut down the amount of air flowing directly over the liquid fuel outlet at the valve 74 as the suction action increases at the nozzle 79. It will be seen that in this carbureter there is a combination of gravity flow and suction tending to deliver the liquid fuel into the manifold. When the engine is running at low speed, or running lightly, a comparatively large amount of air flows through passage 77 and the flow of liquid fuel is therefore largely caused by gravity. But when the engine is running under a heavy load, the throttle 81 is more nearly open and valve 83 is more nearly closed, with the result that a considerable amount of suction is exerted on the fuel flow tending to draw the fuel into the manifold in the stream of air. Now the closure of the valve 83 decreases the active effect of that suction on the fuel which flows through the valve; and thus the amount of liquid fuel is kept constant in proportion to the actual amount of air passing through the carbureter.

The absolute pressure under which this carbureter operates is of no consequence in its effective operation. The upper part of the fuel chamber 70 has a pressure equalizing connection 95 to the passage 77, so that liquid fuel is always under the same pressure in the passage 77 as in the reservoir 70. The normal pressure in the transfer manifold may be either high or low; the carbureter mechanism acts to set its valves in proportion to the variation in the amount of air passing through the carbureter. Of course this variation in amount of air passing through the carbureter is also in accordance with the variation in the difference in pressure on the intake and outgoing sides of the carbueter; and in such a case the valves 81 and 83 and 74 may be operated automatically by a mechanism controlled by the variations in such differences in pressure, as is hereinafter described. Or, in the case of a carbureter which operates with atmospheric pressure at its inlet and the engine suction upon its outlet, the valve 81 may become the primary throttle valve of the whole system, and valve 83 may be actuated then by the amount of suction on the engine side of the valve 81. This is also explained in detail hereinafter. I only speak of these things now in order to point out the fact that this form of carbureter operates regardless of the absolute pressure, and is made to be automatic in its action so as to maintain a perfect mixture. Such being the case, it is of course useful for universal application; but it is particularly useful in my system, where, as hereinbefore explained, I wish to vary the pressure in the transfer manifolds in accordance with the speed of operation, as herein stated.

In an engine of the character which I am now describing, the scavenging air may or may not be under regulating control, depending very largely upon whether the scavenging air is used to form a part of the final work charge in the work cylinder. A part (the first part) of the scavenging air may pass out along with the exhaust, and a part may remain in the cylinder to mingle with the incoming charge proper. Where such is the case the incoming charge proper is usually arranged to be comparatively rich in fuel; and also in such case it may be desirable to somewhat regulate the amount of scavenging air put through. Accordingly there may be a throttle valve 100 in the scavenging air intake 101 and this valve may be connected with valve 90 to operate with it. However, valve 100 will be arranged so that, even when valve 90 is closed, or practically closed, the valve 100 will still allow a certain amount of air to pass to form a minimum scavenging charge.

In this, as in the other forms of two-cycle engines which I herein explain, my preferred cycle of operations for the work cylinder involves approximately the following described sequence. The exhaust is opened at about 50° before bottom dead center, and closes at about 25° after bottom dead center. It is desirable to have the exhaust opened during as short a period as possible, consistent with clean scavenging of the exhaust, in order to keep the expansion stroke as long as possible, and in order to begin the effective compression stroke as soon as possible to get a full charge compressed in the cylinder. The scavenging air opens at about 45° from bottom dead center, shortly after the exhaust opens. It is desirable to open the scavenging air just as soon as possible after the exhaust, just as soon as the pressure within the cylinder has fallen sufficiently that the scavenging air, at its low pressure, may enter. The scavenging air closes at about 10° after the bottom dead center—say, on an average, about 15° before the exhaust closes. The charge proper opens at about 30° before bottom dead center and closes at about the same point that the exhaust closes. Closing the charge at the same time that the exhaust closes, instead of allowing the exhaust to remain open for a longer period, prevents blowing through of the charge. By not leaving the charge port open after the exhaust closes, blowing back of the charge into the charge manifold is prevented. And another reason why I leave the exhaust port open after the scavenging air has closed and during flow of charge proper, in this particular type of engine, is this; that the scavenging air is of less volume than the entire combustion cylinder capacity and the charge proper must displace some of the exhaust. The point of opening of the charge port is fixed more or less by the port area and the time that it is necessary to keep that port open in order to get a full charge into the cylinder. In all cases, however, the charge goes in after the scavenging air goes in; and the stoppage of flow of the scavenging air before the charge proper is stopped, insures a rich enough mixture in the upper part of the cylinder, near the charge port and near the spark plug, to insure ignition.

It will be understood that the various sleeve ports are so placed, and the sleeves are so reciprocated, that the above described actions take place. In the drawings I show the ports placed approximately in correct position, and I show a diagram of sleeve actuating mechanism approximately in correct relation, to accomplish the above described sequence of operations. C designates the center of the crank shaft; C¹ the crank pin center for the piston connecting rod R; C² designates the center of the crank pin or eccentric for the inner sleeve connecting rod $R^2$; and $C^3$ the corresponding center for the outer sleeve connecting rod $R^3$. It will of course be understood, however, that in a drawing of this character it is impracticable to make accurate representations of the timing elements; the positions and sizes of the ports, the throws of the sleeve cranks, and their positions relative to the piston crank, must be accurately worked out on each design.

The form of engine described in the foregoing is provided with positive piston type compressors. In the form now about to be described and shown in Figs. 4 and 5, compression is had from a positive type of blower; and the structure of the engine also differs somewhat from the structure previously described in other details, as will be pointed out. The function of the blower, however, is practically the same as that of the positive compression piston, the blower delivering a volume of air which, at a constant pressure, varies directly in proportion as the speed of operation of the engine. At the comparatively low pressure desired, however, the blower involves less mechanism, and is simpler to construct and to operate, than the piston type compressor. In Figs. 4 and 5 I show two cylinders of an engine. Here the cylinder block 110 is provided with bores in which valved sleeves 111 and 112 reciprocate in the same manner as hereinbefore described. Ports $111^c$ and $112^c$ are adapted to register with exhaust ports $110^c$; charge intake ports $111^d$ and $112^d$ are adapted to register with charge intake ports $110^d$; ports $111^e$ and $112^e$ are adapted to register with the scavenging air intake port $110^e$; all in the same manner and in the same sequence as hereinbefore explained, so that the cycle of operation in the work cylinder above the piston 113 is the same as hereinbefore described. The cylinder head structure 114 extends down inside the upper ends of the two sleeves. It has in it ports 115 and 116 which register with ports $110^d$ and $110^e$; and below these ports the cylinder head structure has a part 117 which forms and encloses a downwardly contracting neck or nozzle 118 through which the scavenging air and the charge proper must pass downwardly in order to reach the space directly over the piston, which at that time is of course in the lower part of its movement. This head structure is somewhat similar in its general characteristics to the head structure described and claimed in my co-pending application, Serial No. 252,356, filed September 3, 1918, entitled internal combustion engine, having, as one of its functions, the partial retention of the charge proper around the spark plug 119. However, the nozzle 118 also performs the function of directing the scavenging air and the charge proper downwardly through the center of the work cylinder space above the piston; so that the stream of charge, in general, is passed downwardly to the top of the piston and then flows upwardly along the cylinder walls to reach the exhaust ports $110^c$, which are in this case located at the upper part of the work cylinder. This expedient practically doubles the length of the path which the charge has to travel in order to reach the exhaust ports, thus diminishing the liability of the charge passing out through the exhaust port and also increasing the length of time that may intervene between the opening of the charge port and the closing of the exhaust without liability of the charge blowing through the exhaust. This part 117 is comparatively heavily constructed and is in immediate metallic connection with the water cooled head so that it carries away heat a great deal better than a baffle mounted on the piston.

I have shown the pistons in these engines rather heavily constructed; particularly at their heads and where the heads join the piston skirts. This is to allow the free flow of heat to the skirt from whence it may be conducted and radiated from a large surface to and through the sleeves to the water jacket. In a two-cycle engine, where there is a great amount of heat to be carried away from the piston, this piston structure is very advantageous. I also show the piston in Fig. 4 provided with transverse oil holes $13^a$ through which lubricating oil may circulate to aid in lubricating the piston. These holes help to keep oil around the upper parts of the piston; and oil for that purpose may come from that carried by the air below the piston.

In this particular embodiment of my invention I show a single positive blower 120 which supplies air under pressure for both scavenging and charge proper. The blower illustrated is that known commercially as the "Sturtevant high pressure" type, positive blower, and need not be particularly described here. It delivers its air at the blower outlet 121 and from this outlet the vertical manifold leg 122 leads up to the charge manifold 123; and also from this outlet a passage 124 may lead through the cylinder block of the engine to the opposite side, and thence upwardly to the manifold 125 which supplies the scavenging ports $110^e$. The scavenging ports and the charge ports being thus fed from the single blower discharge 121, in this case I may utilize a single pressure controlling mechanism which communicates with the blower discharge through the opening 126. This pressure controlling mechanism involves practically the same devices as before; a shunt reservoir 127 into which the air flows through the valve 128, and out of which the air restrictedly flows through the passage 129 controlled by the adjustable valve 130. The action is the same as hereinbefore explained. The carbureter nozzle 131 is placed in the vertical manifold leg 122; and, as shown at 132, I may use a Venturi nozzle to increase the suction action on the fuel in nozzle 131. The carbureter construction is substantially the same as hereinbefore described, the same numerals as hereinbefore used being applied to corresponding parts. The only substantial change in construction, so far as the carbureter is concerned, is that the passage 77, after being continued up high enough to have its upper end above the highest liquid level at L, is then extended downwardly as shown at 77$^c$, to communicate at 133 with the air passage below the carbureter throttle 81. There is a connection 134 between the valve 83 and the fuel valve 74, and there is a connection 135 between the throttle valve 81 and the fuel valve 74. Between the throttle valve 81 and control throttle 136 (which controls the intake of air to the rotary blower), there is a connection 137. All these connections cause the connecting parts to cooperate in the manner hereinbefore explained.

As I have before said the carbureter throttle 81, and its connected cooperating parts, are operated in accordance with the amount of air passing through the carbureter—not necessarily in accordance with the absolute pressure under which the carbureter operates. Consequently valve 81 may be actuated by the difference in pressure on opposite sides of it, and although more accurate and steady means may be used for operating the valve, I show in Fig. 6 a very simple means by which the objects may be accomplished, in order to illustrate and explain the general methods. Fig. 6 shows a part of the mechanism similar to that shown in Figs. 4 and 5, wherein the rotary fuel valve 74 is connected by connection 135 to throttle 81 and the valve 83 is connected by connection 134 to the rotary fuel valve. Of course, where the valve 81$^a$, as shown at Fig. 6, is actuated directly by a difference in pressure, the connection between it and the primary control throttle, is omitted. In Fig. 6 I show the throttle 81$^a$ as being somewhat unbalanced. This may be accomplished by merely cutting away one edge of the throttle as indicated at 81$^b$, so that under pressure the throttle tends to open in the direction indicated by the arrow. A spring 140 is connected to the throttle shaft to oppose opening movement of the throttle; and this spring may be adjustable, by such an adjustment as is indicated at 141, so as to vary its effect on throttle 81$^a$ if adjustment is needed. The spring will be so constructed that it will oppose the opening of the throttle by a comparatively light force, (the throttle being only slightly unbalanced) and graduated so that the throttle will open substantially to the same position, to pass a given amount of air, as it would be opened by the other mechanisms hereinfore explained to pass that quantity of air, operating at any given absolute pressure. Thus, by this automatic action, valve 81$^a$ is thrown to the same position that it would be thrown by the other mechanism to pass a given amount of air; consequently the connected parts will be thrown to the same position as those to which they would be thrown by the other type of mechanism.

I have now described certain mechanisms which control the pressure of the compressed charge in such a manner as to modify that pressure to suit the requirements of varying speeds of operation. I have stated that that requirement is, with properly designed passage ways which have no projections, and which allow free flow of the charge, that the effective pressure varies approximately as the square of the speed of operation, in order that the velocity of the charge may vary as the speed of operation. I have found that an air blower of the centrifugal type substantially meets these requirements; such a blower delivering a volume of air proportionate to the speed of operation at a pressure substantially proportionate to the square of that speed. Consequently, in order to attain my objects, it is also possible to use such a centrifugal type of blower, and such a blower may be used with or without the controlling mechanism hereinbefore explained. If used without the controlling mechanism it in itself substantially answers the requirements; but a use of the controlling mechanism with it will tend to smooth over the inequalities due to the pulsating action of the engine itself. In Figs. 7 and 10 I illustrate this form of my invention. Here I also illustrate a poppet valve engine instead of a sleeve valve engine, in order to show how my invention may be applied to a two-cycle engine using poppet valves. Also having hereinbefore explained and described how the compressor elements may all compress as a unit for all of the cylinders in common (the first described type) and having described how the blower may be used for a plurality of cylinders, (second described type) I describe in this form now, and show in Figs. 8 to 10, the application of an individual compressor for each cylinder. However, it will be readily understood that one or more such centrifugal compressors may be used for a multiple cylinder engine, in accordance with the descriptions hereinbefore given. In this particular form of my invention I also show my carbureter operating with atmospheric pressure at its intake side, and with suction (the suction of the centrifugal fan in this case), on its outgoing side.

Referring first to Figs. 7 and 8, I show a cylinder block at 210 having therein a cylinder 211 in which piston 212 is adapted to reciprocate. Above the cylinder block there is a head block 213 which has arched passages 214 and 215 in it. The sectional and plan configuration of these passages is shown in Figs. 7 and 8. The arched passage 214 extends over the two inlet valves 216 and 217, being the valves to admit the charge proper and to admit the scavenging air, respectively. There is a water cooled baffle at 218 between the two arched passages; and the purpose of this baffle is to direct the scavenging air and the charge proper downwardly along one side of the cylinder so that the charge will pass first downwardly to strike the piston, which is then in a lower position, and then will pass upwardly to the upper end of the cylinder before reaching the exhaust valve 219. Valves 216, 217 and 219 are opened and closed in the sequence hereinbefore set forth, being operated by any suitable mechanism, such as by the cam mechanism, illustrated at 220 and 221. The location of the exhaust valves at the top of the cylinder has the same features of advantage as before explained. The placement of the baffle or charge directive means at the top puts that baffle either in direct metallic connection to the water cooled head (see the form of Fig. 7) or enables the baffle to be directly water cooled in the head. This materially decreases the liability of preignition, as compared with the baffle being on the hot piston. Each inlet valve passage 222 has the discharge 223 of a centrifugal fan 224 connected directly with it; the fan blowing directly into the valve passage and preferably without any obstruction between. Centrifugal fan 224, hereinafter described, may be of any of the common types having an intake at its center at 225 and throwing the air around and outwardly to and through the outlet 223. The fan may have any number of stages; for simplicity's sake I illustrate only a single stage. Also the fan may be placed in any suitable position relative to the engine and convenient for driving connection therewith. The capacity of the fan, as that of any type of compression, is sufficient to feed all the air the engine requires at any speed. The charge inlet valve adjacent the cylinder may be arranged together so that the fans 224 for those charge inlet valves may be connected by a common pipe 226 to one carbureter which may serve for both the cylinders. This carbureter, as shown in Fig. 7, is of the same type as that shown in and described in connection with Fig. 5; and need not be further explained here except to note that the auxiliary air passage 77 is open to atmosphere at the upper end as is also the lower end of the carbureter pipe 226. The remainder of the construction is practically the same, and operates in the same manner, as that explained in connection with Fig. 5; the absolute pressure under which this carbureter operates being atmospheric, or substantially so, instead of a pressure raised by a compression means. The passage of air to the carbureter is caused in this case by the suction upon its discharge side. Throttle valve 81 of the carbureter becomes now the primary control valve of the engine, being manipulated by manual or other control. The auxiliary valve 83 is connected with throttle valve 81 to operate therewith, and the rotary fuel valve 74 is also connected with the throttle to co-operate with it. Now in this case it will be noted that the amount of air passing through the carbureter is of course determined by the amount by which throttle valve 81 is opened. As the valve 81 is closed, the difference in pressure on opposite sides of that valve, becomes greater, due to the unsatisfied vacuum on the engine side of the valve. As that vacuum becomes greater (in proportion as valve 81 is closed) it is desired to have valve 83 open. Now this may be done through the medium of an automatic mechanism such as shown in Fig. 9. A small diaphragm or piston, as shown at 230, may be exposed to the vacuum above throttle 81. A suitable spring 231 may oppose the inward movement of piston 230, which is exposed to atmospheric pressure on its exterior face. The piston stem 232 is connected at 233 with the small valve 83 in such a manner that an increase in suction on the inner face of the piston will cause the valve 83 to open.

In Figs. 10 and 11 I illustrate the use of a single centrifugal fan 224ᵃ for a plurality of cylinders; the engine construction illustrated at Figs. 10 and 11 being the same as that illustrated in Figs. 7 and 8. Here I illustrate also the use of the pressure controlling mechanism and the use of the carbureter between the centrifugal fan and the engine intake, the same as in Fig. 5; the same reference numerals being applied to corresponding parts. However, in the case of using a centrifugal fan, it may not be necessary to use a throttle outside the fan, as a centrifugal fan will merely build up its certain maximum pressure, (which pressure of course depends upon its speed) and will then not build up any more pressure; being in this feature unlike a positive pump.

Another feature of the centrifugal fan is to be noted. In itself it tends to keep up a substantially constant pressure throughout the stroke; thus accomplishing the purpose hereinbefore explained as an accomplishment of the auxiliary reservoir in connection with the positive pumps.

It is to be noted that the throttle 81 or 81ᵃ, of Figs. 1, 4, 5, 6, 7, or 10, stands between the source of compression and the engine intake. Now if this throttle is yieldingly "loaded", such as by having it equipped with a closing spring as shown in Fig. 6, it will of course tend to restrict and retard the passage of charge to the intake ports in a manner which will depend on the characteristics of the spring. If the spring is made to act in the manner hereinbefore set forth and particularly is made so that it opposes less relative resistance to the passage of charge at high speed (high pressure) than at low speed (low pressure) it is readily to be seen that it will more retard the low speed action of the charge than it will the high speed action. Thus the retarding action at high speed may be substantially nothing while that at low speed may be made relatively great. Under these circumstances, if the compressor capacities, etc. are sufficient at high speed, the low speed action may be retarded very substantially by the butterfly valve; so that the valve, in itself, may very substantially attain the desired action or very materially help in that attainment. For instance the spring 140 in Fig. 6 may press against an arm 140ᵃ on shaft 82ᵃ. As the arm swings around to the left in Fig. 6 it goes to a position where the pressure of the spring has less and less power to close the valve.

In an injection engine the whole charging mechanism may be further simplified. Here it may be desirable to have only one air charging means, and the air charge from that means may play the part of both scavenging and charging proper. Any of the charging mechanisms hereinbefore explained may be used; in connection with any type of engine. For the purposes of simply illustrating the application of my invention to such an engine I show, in Fig. 13 the poppet type as previously explained and apply a single centrifugal fan 224ᵇ to the inlet valve 216ᵇ. This valve may open at the time fixed for the opening of the scavenging port and close either at the time fixed for closing of that port or of the charge port. Fuel injection may be had by any suitable means, as by a pump 250 forcing fuel through nozzle 251. The action in this type of engine to maintain full charge at varying speeds is the same as before described.

It will not now be necessary for one to recapitulate the features and accomplishments of my invention as they have been set out in connection with the description. They include the provision of the uniform weight of charge and uniform compression pressure, so far as variations in operating speed are concerned; better carburetion due to more uniform and higher velocity of the charge; smaller valves and better valve cooling; and numerous other advantages as set out. I do not, however, wish to restrict my invention to the particulars herein set forth as they are illustrative rather than limitative; I consider my invention as broad and fundamental rather than specific; being only limited as set out in the following claims which are to be read in their broader and more inclusive meanings as well as in their specific senses.

Having described a preferred form of my invention, I claim:

1. In combination with an internal combustion engine having an intake, means to feed charge to the intake at a pressure varying substantially in accordance with the varying resistance to flow of the charge at varying operating speeds; said means embodying an intake passage leading to the intake, a compressor adapted to compress charge into the passage at a pressure sufficient to flow the charge through the intake at the highest speed of engine operation, an auxiliary reservoir and communication means between the passage and the reservoir automatically throwing the reservoir out of action at high speed operation.

2. In combination with an internal combustion engine having an intake means to feed charge to the intake at a pressure varying substantially in accordance with the varying resistance to flow of the charge at varying operating speeds; said means embodying an intake passage leading to the intake, a compressor adapted to compress charge into the passage at a pressure sufficient to flow the charge through the intake at the highest speed of engine operation, an auxiliary reservoir in relatively free communication with the passage for entry of charge to the reservoir and in relatively restricted communication with the passage for flow of charge from the reservoir into the passage.

3. In combination with an internal combustion engine having an intake, means to feed charge to the intake at a pressure varying substantially in accordance with the varying resistance to flow of the charge at varying operating speeds; said means embodying an intake passage leading to the intake, a compressor adapted to compress charge into the passage at a pressure sufficient to flow the charge through the intake at the highest speed of engine operation, an auxiliary reservoir and communication means between the passage and the reservoir automatically throwing the reservoir out of action at high speed operation; the combined capacity of the passage and reservoir being such that the compressor acting at low operating speeds will fill them with charge at a pressure proportionate to the lowered intake resistance at such speeds.

4. In combination with an internal combustion engine having an intake, means to feed charge to the intake at a pressure varying substantially in accordance with the varying resistance to flow to the charge at varying operating speeds; said means embodying an intake passage leading to the intake, a compressor adapted to compress charge into the passage at a pressure sufficient to flow the charge through the intake at the highest speed of engine operation, an auxiliary reservoir in relatively free communication with the passage for entry of charge to the reservoir and in relatively restricted communication with the passage for flow of charge from the reservoir into the passage; the combined capacity of the passage and reservoir being such that the compressor acting at low operating speeds will fill them with charge at a pressure proportionate to the lowered intake resistance at such speeds.

5. In combination with an internal combustion engine having an intake, means to feed charge to the intake at a pressure varying substantially in accordance with the varying resistance to flow of the charge at varying operating speeds; said means embodying an intake passage leading to the intake, a compressor adapted to compress the charge into the passage, the passage being of such capacity and the compressor of such adaptations operating at high speed as to fill the passage with charge at a sufficient pressure to flow the charge through the intake at high speeds of engine operation; an auxiliary reservoir whose capacity is such that the compressor is able to fill it and the passage at a pressure suitable to flow the charge through the intake at low speeds of operation, and communication between the reservoir and passage.

6. In combination with an internal combustion engine having an intake, means to feed charge to the intake at a pressure varying substantially in accordance with the varying resistance to flow of the charge at varying operating speeds; said means embodying an intake passage leading to the intake, a compressor adapted to compress the charge into the passage, the passage being of such capacity and the compressor of such adaptation operating at high speed as to fill the passage with charge at a sufficient pressure to flow the charge through the intake at high speeds of engine operation; an auxiliary reservoir whose capacity is such that the compressor is able to fill it and the passage at a pressure suitable to flow the charge through the intake at low speeds of operation, and communication from the passage to the reservoir allowing free entry to the reservoir and restricted flow from the reservoir to the passage.

7. In combination with an internal combustion engine having an intake, means to feed charge to the intake at a pressure varying substantially in accordance with the varying resistance to flow of the charge at varying operating speeds; said means embodying an intake passage leading to the intake, a compressor adapted to compress the charge into the passage, the passage being of such capacity and the compressor of such adaptation operating at high speed as to fill the passage with charge at a sufficient pressure to flow the charge through the intake at high speeds of engine operation; an auxiliary reservoir whose capacity is such that the compressor is able to fill it and the passage at a pressure suitable to flow the charge through the intake at low speeds of operation, a valve controlled communication allowing free flow from the passage to the reservoir and preventing back flow, and a restricted communication allowing back flow from the reservoir to the passage.

8. In combination with an internal combustion engine having a work cylinder with exhaust and intake and valvular means for the exhaust and intake causing them to be open simultaneously, means to feed charge to the intake at a pressure varying substantially in accordance with the various resistance to flow of the charge at varying operating speeds; said means embodying an intake passage leading to the intake, a compressor adapted to compress charge into the passage at a pressure sufficient to flow the charge through the intake at the highest speed of engine operation, an auxiliary reservoir and communication means between the passage and the reservoir automatically throwing the reservoir out of action at high speed operation.

9. In combination with an internal combustion engine having a work cylinder with exhaust and intake and valvular means for the exhaust and intake causing them to be open simultaneously, means to feed charge to the intake at a pressure varying substantially in accordance with the varying resistance to flow of the charge at varying operating speeds; said means embodying an intake passage leading to the intake, a compressor adapted to compress charge into the passage at a pressure sufficient to flow the charge through the intake at the highest speed of engine operation, an auxiliary reservoir in relatively free communication with the passage for entry of charge to the reservoir and in relatively restricted communication with the passage for flow of charge from the reservoir into the passage.

10. In combination with an internal combustion engine having a work cylinder with exhaust and intake and valvular means for the exhaust and intake causing them to be open simultaneously, means to feed charge to the intake at a pressure varying substantially in accordance with the varying resistance to flow of the charge at varying operating speeds; said means embodying an intake passage leading to the intake, a compressor adapted to compress charge into the passage at a pressure sufficient to flow the charge through the intake at the highest speed of engine operation, an auxiliary reservoir and communication means between the passage and the reservoir automatically throwing the reservoir out of action at high speed operation; the combined capacity of the passage and reservoir being such that the compressor acting at low operating speeds will fill them with charge at a pressure proportionate to the lowered intake resistance at such speeds.

11. In combination with an internal combustion engine having a work cylinder with exhaust and intake and valvular means for the exhaust and intake causing them to be open simultaneously, means to feed charge to the intake at a pressure varying substantially in accordance with the varying resistance to flow of the charge at varying operating speeds; said means embodying an intake passage leading to the intake, a compressor adapted to compress charge into the passage at a pressure sufficient to flow the charge through the intake at the highest speed of engine operation, an auxiliary reservoir in relatively free communication with the passage for entry of charge to the reservoir and in relatively restricted communication with the passage for flow of charge from the reservoir into the passage; the combined capacity of the passage and reservoir being such that the compressor acting at low operating speeds will fill them with charge at a pressure proportionate to the lowered intake resistance at such speeds.

12. In combination with an internal combustion engine having a work cylinder with exhaust and intake and valvular means for the exhaust and intake causing them to be open simultaneously, means to feed charge to the intake at a pressure varying substantially in accordance with the varying resistance to flow of the charge at varying operating speeds; said means embodying an intake passage leading to the intake, a compressor adapted to compress the charge into the passage, the passage being of such capacity and the compressor of such adaptation operating at high speed as to fill the passage with charge at a sufficient pressure to flow the charge through the intake at high speeds of engine operation; an auxiliary reservoir whose capacity is such that the compressor is able to fill it and the passage at a pressure suitable to flow the charge through the intake at low speeds of operation, and communication between the reservoir and passage.

13. In combination with an internal combustion engine having a work cylinder with exhaust and intake and valvular means for the exhaust and intake causing them to be open simultaneously, means to feed charge to the intake at a pressure varying substantially in accordance with the varying resistance to flow of the charge at varying operating speeds; said means embodying an intake passage leading to the intake, a compressor adapted to compress the charge into the passage, the passage being of such capacity and the compressor of such adaptation operating at high speed as to fill the passage with charge at a sufficient pressure to flow the charge through the intake at high speeds of engine operation; an auxiliary reservoir whose capacity is such that the compressor is able to fill it and the passage at a pressure suitable to flow the charge through the intake at low speeds of operation, and communication from the passage to the reservoir allowing free entry to the reservoir and restricted flow from the reservoir to the passage.

14. In combination with an internal combustion engine having a work cylinder with exhaust and intake and valvular means for the exhaust and intake causing them to be open simultaneously, means to feed charge to the intake at a pressure varying substantially in accordance with the varying resistance to flow of the charge at varying operating speeds; said means embodying an intake passage leading to the intake, a compressor adapted to compress the charge into the passage, the passage being of such capacity and the compressor of such adaptation operating at high speed as to fill the passage with charge at a sufficient pressure to flow the charge through the intake at high speeds of engine operation; an auxiliary reservoir whose capacity is such that the compressor is able to fill it and the passage at a pressure suitable to flow the charge through the intake at low speeds of operation, a valve controlled communication allowing free flow from the passage to the reservoir and preventing back flow, and a restricted communication allowing back flow from the reservoir to the passage.

15. In combination with an internal combustion engine having an intake, means to feed an air charge to the intake at a pressure varying substantially in accordance with the varying resistance to flow of the charge at varying operating speeds; and carbureter means to supply liquid fuel to the air charge in proportion to the velocity of the charge through the intake, said carbureter means including a pressure equalizing means so that the carbureter acts indifferently under varying pressures.

16. In combination with an internal combustion engine having a work cylinder with exhaust and intake and valvular means for the exhaust and intake causing them to be open simultaneously, means to feed charge to the intake at a pressure varying substantially in accordance with the varying resistance to flow of the charge at varying operating speeds; and means to supply liquid fuel to the charge while under that pressure.

17. In combination with an internal combustion engine having a work cylinder with exhaust and intake and valvular means for the exhaust and intake causing them to be open simultaneously, means to feed an air charge to the intake at a pressure varying substantially in accordance with the varying resistance to flow of the charge at varying operating speeds; and carbureter means to supply liquid fuel to the air charge in proportion to the velocity of the charge through the intake.

18. In combination with an internal combustion engine having a work cylinder with exhaust and intake and valvular means for the exhaust and intake causing them to be open simultaneously, means to feed an air charge to the intake at a pressure varying substantially in accordance with the varying resistance to flow of the charge at varying operating speeds; and carbureter means to supply liquid fuel to the air charge in proportion to the velocity of the charge through the intake, said carbureter means including a pressure equalizing means so that the carbureter acts indifferently under varying pressures.

19. In combination with an internal combustion engine having a work cylinder and exhaust and intakes therefor, means to compress a charge of scavenging air to an intake, means to compress a combustible charge to an intake, and means to vary the pressure of both the charges in proportion to the varying resistances to their flow at varying speeds of engine operation.

20. In combination with an internal combustion engine having a work cylinder and exhaust and intakes therefor, and valvular means for holding open the exhaust and intakes simultaneously, means to compress a charge of scavenging air to an intake, means to compress a combustible charge to an intake, and means to vary the pressure of both the charges in proportion to the varying resistances to their flow at varying speeds of engine operation.

21. In combination with an internal combustion engine having a work cylinder and exhaust and intakes therefor, and valvular means for holding open the exhaust and intakes simultaneously, means to compress a charge of scavenging air to an intake, means to compress a combustible charge to an intake, and means to vary the pressure of both the charges in proportion to the varying resistances to their flow at varying speeds of engine operation; and means to form the combustible charge while under pressure.

22. In combination with an engine of the two-cycle type having a work cylinder with exhaust and intake parts and valvular means for holding the parts open simultaneously, two separate air compressing means for compressing a charge of scavenging air and work charge air to the intake ports, means for varying the pressure of both air charges in proportion to the varying resistance to their flow at varying speeds of engine operation, and means to carburet the work charge air while under pressure.

23. In combination with an engine of the two-cycle type having a work cylinder with exhaust and intake ports and valvular means for holding the parts open simultaneously, two separate air compressing means for compressing a charge of scavenging air and work charge air to the intake ports, means for varying the pressure of both air charges in proportion to the varying resistance to their flow at varying speed of engine operation; and carbureter means to supply liquid fuel to the work charge air in proportion to its velocity through the port, said carbureter means including a pressure equalizing means so that it acts indifferently under varying pressures.

24. In combination with an engine of the two-cycle type having a work cylinder with exhaust and intake ports and valvular means for holding the parts open simultaneously, two separate air compressing means for compressing a charge of scavenging air and work charge air to the intake ports, means for varying the pressure of both air charges in proportion to the varying resistances to their flow at varying speed of engine operation; means to separate suspended lubricating oil from the air charges; and means to carburet the work charge air while under pressure.

25. In combination with an engine of the two-cycle type having a work cylinder with exhaust and intake ports and valvular means for holding the ports open simultaneously, two separate air compressing means for compressing a charge of scavenging air and work charge air to the intake ports, means for varying the pressure of both air charges in proportion to the varying resistances to their flow at varying speed of engine operation, means to separate suspended lubricating oil from the air charges; and carbureter means to supply liquid fuel to the work charge air in proportion to its velocity through the port, said carbureter including a pressure equalizing means so that it acts indifferently under varying pressures.

In witness that I claim the foregoing I have hereunto subscribed my name this 22nd day of July 1920.

JOHN M. CAGE.